(12) United States Patent
Lan et al.

(10) Patent No.: US 12,499,894 B1
(45) Date of Patent: Dec. 16, 2025

(54) VIDEO CONFERENCE TRANSCRIPT QUERYING USING ARTIFICIAL INTELLIGENCE

(71) Applicant: Zoom Video Communications, Inc., San Jose, CA (US)

(72) Inventors: Guitang Lan, Basking Ridge, NJ (US); Bilung Lee, San Jose, CA (US); Vijay Venkataswamy Parthasarathy, San Jose, CA (US); Sebastian Stüker, Karlsruhe (DE); Sasank Vemuri, Pflugerville, TX (US)

(73) Assignee: Zoom Communications, Inc., San Jose, CA (US)

( * ) Notice: Subject to any disclaimer, the term of this patent is extended or adjusted under 35 U.S.C. 154(b) by 244 days.

(21) Appl. No.: 18/383,751

(22) Filed: Oct. 25, 2023

Related U.S. Application Data

(60) Provisional application No. 63/538,633, filed on Sep. 15, 2023.

(51) Int. Cl.
  *G10L 15/26* (2006.01)
(52) U.S. Cl.
  CPC .................................. *G10L 15/26* (2013.01)
(58) Field of Classification Search
  CPC ....................................................... G10L 15/26
  USPC ..................................................... 348/14.08
  See application file for complete search history.

(56) References Cited

U.S. PATENT DOCUMENTS

| | | | |
|---|---|---|---|
| 11,315,569 B1 * | 4/2022 | Talieh ................. | H04L 12/1831 |
| 11,595,515 B2 * | 2/2023 | van Rensburg ....... | H04L 9/3239 |
| 11,615,799 B2 * | 3/2023 | Zhu ....................... | G06F 16/345 |
| | | | 704/235 |
| 11,765,267 B2 * | 9/2023 | Cole .................... | H04M 3/5141 |
| | | | 379/68 |
| 2010/0299131 A1 * | 11/2010 | Lanham ................. | G06V 20/40 |
| | | | 704/235 |
| 2010/0332225 A1 * | 12/2010 | Arrowood ............... | G10L 15/26 |
| | | | 704/235 |
| 2016/0306788 A1 * | 10/2016 | Avore ................... | G06F 16/685 |
| 2019/0294668 A1 * | 9/2019 | Goel .................. | H04N 21/4788 |
| 2020/0349614 A1 * | 11/2020 | Batcha .................... | G10L 15/26 |
| 2022/0215052 A1 * | 7/2022 | Chalana ................ | G06F 16/739 |
| 2022/0293107 A1 * | 9/2022 | Leaman ................. | G06N 20/00 |
| 2023/0009304 A1 * | 1/2023 | Jakobsson .......... | G06Q 30/0241 |

(Continued)

*Primary Examiner* — Binh Kien Tieu

(74) *Attorney, Agent, or Firm* — Kilpatrick Townsend & Stockton, LLP

(57) ABSTRACT

Techniques for video conference transcript querying using artificial intelligence are provided. In an example method, a video conference provider joins a first client device of a plurality of client devices to a video conference hosted by a video conference provider. The video conference provider receives an audio stream from the first client device and generates, based on the audio stream, a portion of a transcript of the video conference. The video conference provider processes the portion of the transcript to configure an AI service to respond to queries based on the video conference. The video conference provider receives a query relating to the video conference and causes the AI service to process the query and the portion of the transcript. The video conference provider outputs a response, generated by the AI service, to the query. The video conference provider then deletes the transcript, responsive to the video conference concluding.

20 Claims, 8 Drawing Sheets

(56) References Cited

U.S. PATENT DOCUMENTS

| | | | | |
|---|---|---|---|---|
| 2023/0115098 | A1* | 4/2023 | Miller | G06F 40/30 |
| | | | | 704/235 |
| 2023/0410801 | A1* | 12/2023 | Mishra | H04L 51/02 |
| 2024/0176960 | A1* | 5/2024 | Maurer | G06F 16/345 |
| 2024/0414017 | A1* | 12/2024 | Lee | G06F 16/90332 |
| 2024/0420682 | A1* | 12/2024 | Kim | G10L 15/063 |
| 2025/0080654 | A1* | 3/2025 | Kuppulal | H04M 3/5175 |
| 2025/0124072 | A1* | 4/2025 | Saggi | G06F 16/45 |

* cited by examiner

VIDEO CONFERENCE TRANSCRIPT QUERYING USING ARTIFICIAL INTELLIGENCE

CROSS-REFERENCE TO RELATED APPLICATIONS

This application claims priority from U.S. Provisional Patent Application No. 63/538,633, filed Sep. 15, 2023, titled "Video Conference Transcript Querying Using Artificial Intelligence," the entirety of which is hereby incorporated by reference.

FIELD

The present application generally relates to video conferencing, and more particularly relates to techniques for video conference transcript querying using artificial intelligence.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
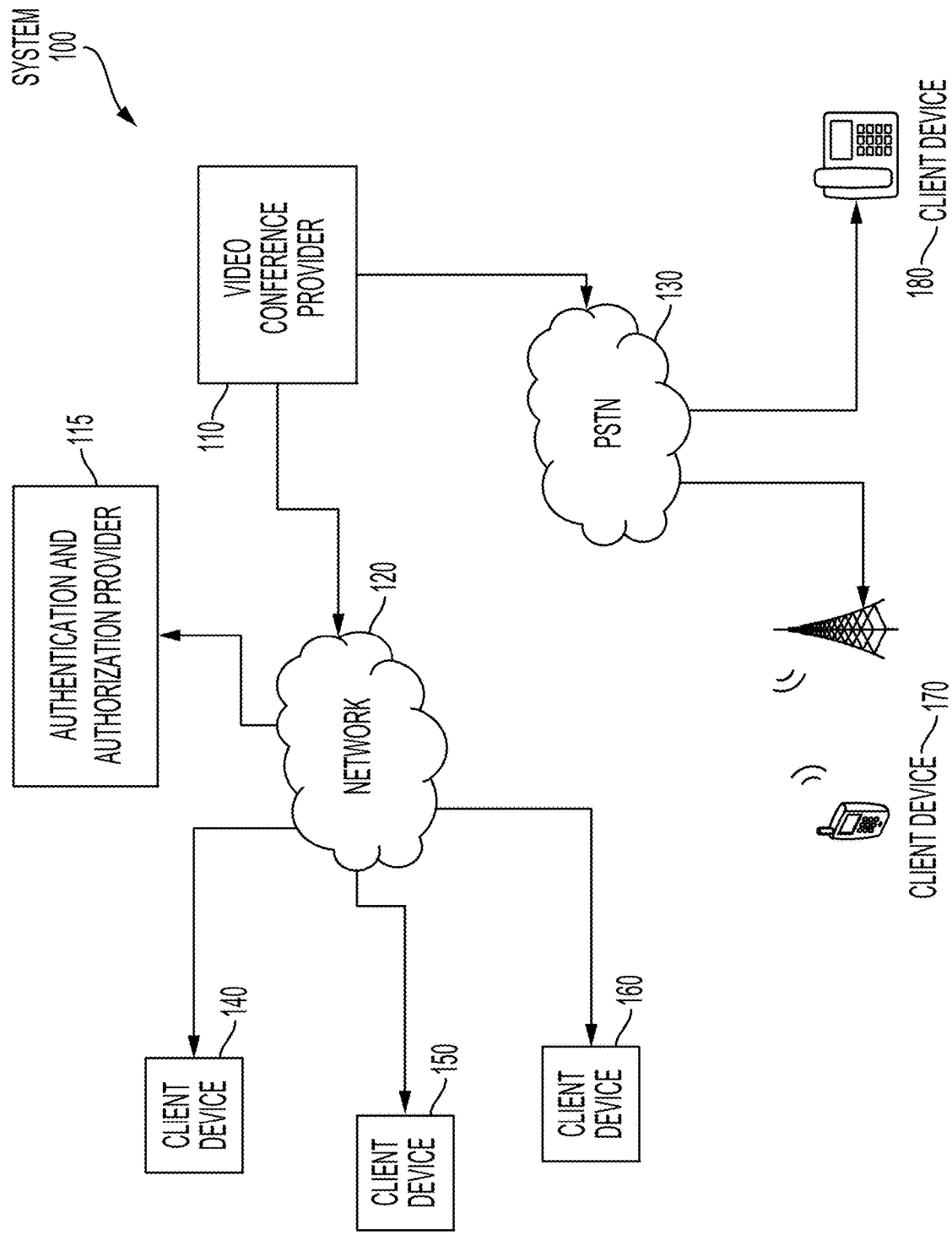
FIG. 1 shows an example system that provides videoconferencing functionality to various client devices.

Examples are described herein in the context of techniques for video conference transcript querying using artificial intelligence. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

The integration of artificial intelligence (AI) services into the video conference user experience is becoming increasingly common and important. For example, AI services integrated with video conferencing platforms can be used for summarization, generation of tasking based on meeting content, sentiment analysis, speaker identification, translation, and so on. AI services can also be used for virtual coaching. For instance, a particular segment of a video conference may be used to provide feedback to the participants relating to the spoken content during the segment.

In some examples, AI services may be provided with reference to or a copy of a video conference recording or a transcript of a recording. For instance, following the conclusion of a video conference, a transcript may be generated based on a recording of the video conference. An AI service can ingest the video conference transcript and then answer queries based on the transcript content. A video conference participant may, for example, request a summary of a concluded video conference.

However, generation of video conference recordings or persisted transcripts of such recordings may be undesirable for several reasons. Some video conferences involve privacy or security concerns that preclude recording of the video conference. It may be impossible or impractical to obtain consent from some or all participants. In some cases, there may be regulatory barriers to the obtaining of recordings. Additionally, recordings may be extremely large and storage of recordings for some or all video conferences may not be practical. Furthermore, transcription services may be expensive or unavailable in the necessary time frame.

Techniques for video conference transcript querying using AI are disclosed that can provide a variety of AI services, such as transcript-only analytics, based on video conference content without recording the video conference or permanently persisting a transcript. In an example method, a video conference provider hosts a video conference with a plurality of participants. One or more of the client devices sends an audio stream to the video conference provider. For example, several participants may be having a confidential conversation that is relayed to the video conference provider. The video conference provider generates a transcript of the received audio stream. Transcripts may be generated following the conclusion of the meeting or may be generated continuously as the meeting proceeds, such that the transcript can be used as a basis for AI-based queries in near-real-time.

In the example method, the video conference provider causes the transcript to be ingested to an AI service or updates a transcript that has already been ingested. For example, if the AI service includes a large language model (LLM) such as one based on the Generative Pre-trained Transformer (GPT) language models, the transcript may be provided to the LLM, along with other contextual data, as context for responding to queries that are scoped to the video conference. The video conference provider may then receive a query relating to the context or content of the video conference. For example, a user of a client device may request a summarization of the meeting up to that point, a list of action items thus far, what the general tone of the meeting has been, and so on. The video conference provider can then output a response to the query based on the transcript generated by the AI service.

Later, in the example method, the video conference provider, responsive to the video conference concluding, deletes the portion of the transcript for configuring the AI service. Deletion of the transcript, in this context, may refer to removing the transcript from short- or long-term memory, caches, swap spaces, etc. such that any record of the meeting is permanently deleted. A recording is not generated or persisted either, unless each of the participants explicitly consent to recording the video conference. In some examples, the transcript may be temporarily persisted until a participant affirmatively requests deletion. In some examples, a participant may request that the transcript be permanently persisted so that it can be queried in the future. In such cases, consent of all affected participants may be required.

The innovations of the present disclosure provide significant improvements in the field of video conferencing technology. In particular, the innovations improve the privacy and security available through video conferencing technology while simultaneously improving the capabilities of video conferencing platforms. Because neither a recording nor a transcript is persisted without explicit consent of the participants, video conference participants can be confident in the long-term confidentiality of video conference content, when desired. Existing systems require a persisted record to utilize AI services during video conferences. Additionally, methods according with the present disclosure can respond to transcript-based queries using portions of the generated transcript and further can update the transcript as additional data becomes available or is corrected by transcription services with improved fidelity. This enables near-real-time queries limited by the speed of the transcription services. Existing systems lack the capability to execute near-real-time queries without any risk of an associated persisted record.

Moreover, the techniques of the present disclosure can significantly reduce the consumption of computing resources. First, since neither a recording nor a transcript needs to be persisted to provide these services, the consumption of disk space can thereby be reduced. Next, since consumption of AI services can be limited to the duration of a video conference, the consumption of those resources is overall reduced since there is no possibility of later queries. Additionally, since queries in near-real-time can be based on partial video conference transcripts, the AI service only processes the portion of the transcript up to that point. In contrast, existing query-based AI services need to ingest the entirety of a transcript after the video conference has concluded for each query or group of queries. Along the same lines, AI services can maintain the context of a given conference for the duration of the video conference, updating the transcript as it is received, reducing the need for refreshing of the associated context for each query. Finally, consumption of computing resources may be overall reduced through the gains associated with queries such as summarization. Where before computing resources were expended to review recordings and transcripts, video conferences may only now be summarized during the meeting, ensuring that future resources not expended with similar tasks.

These illustrative examples are given to introduce the reader to the general subject matter discussed herein and the disclosure is not limited to these examples. The following sections describe various additional non-limiting examples of techniques for video conference transcript querying using artificial intelligence.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
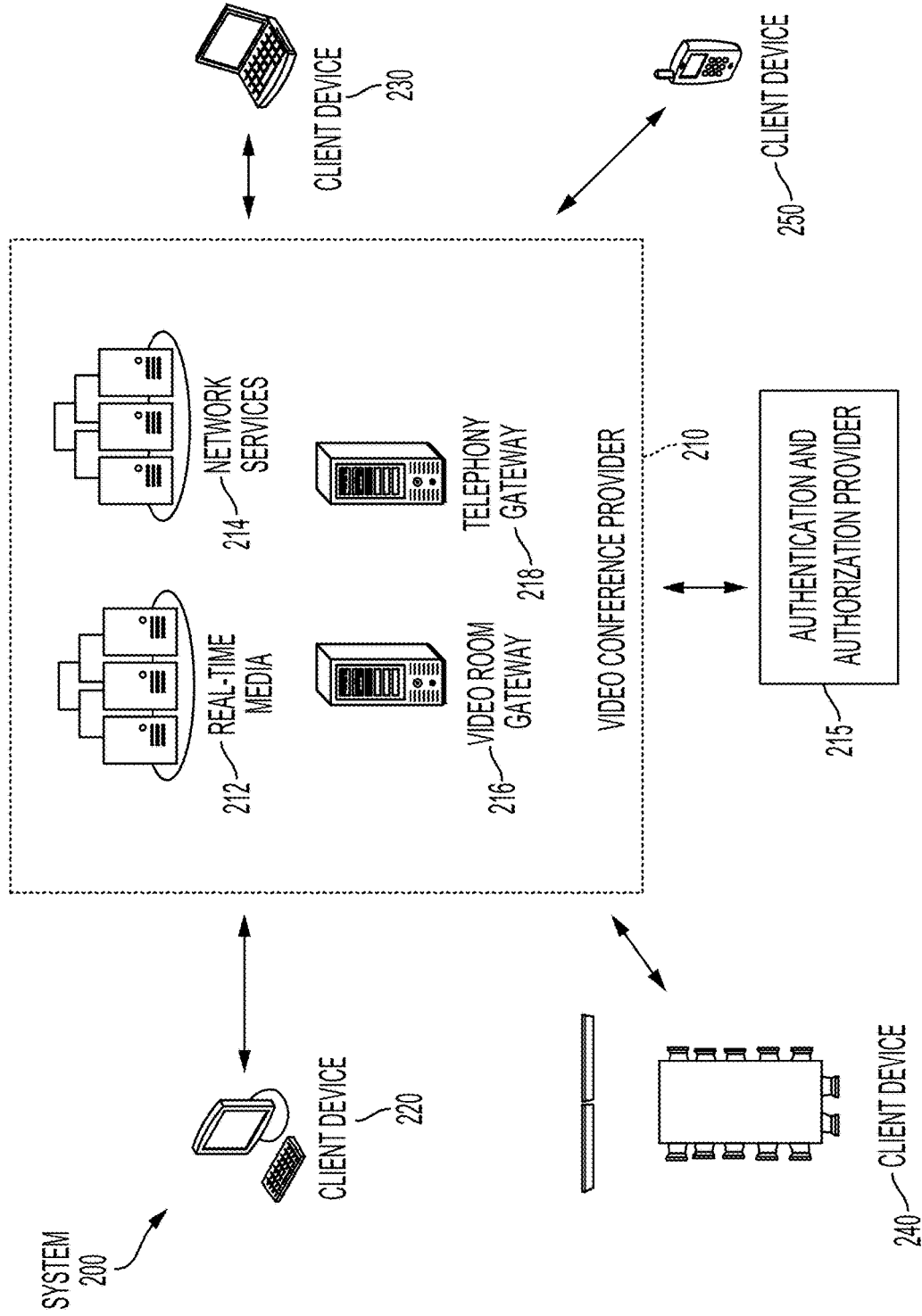
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
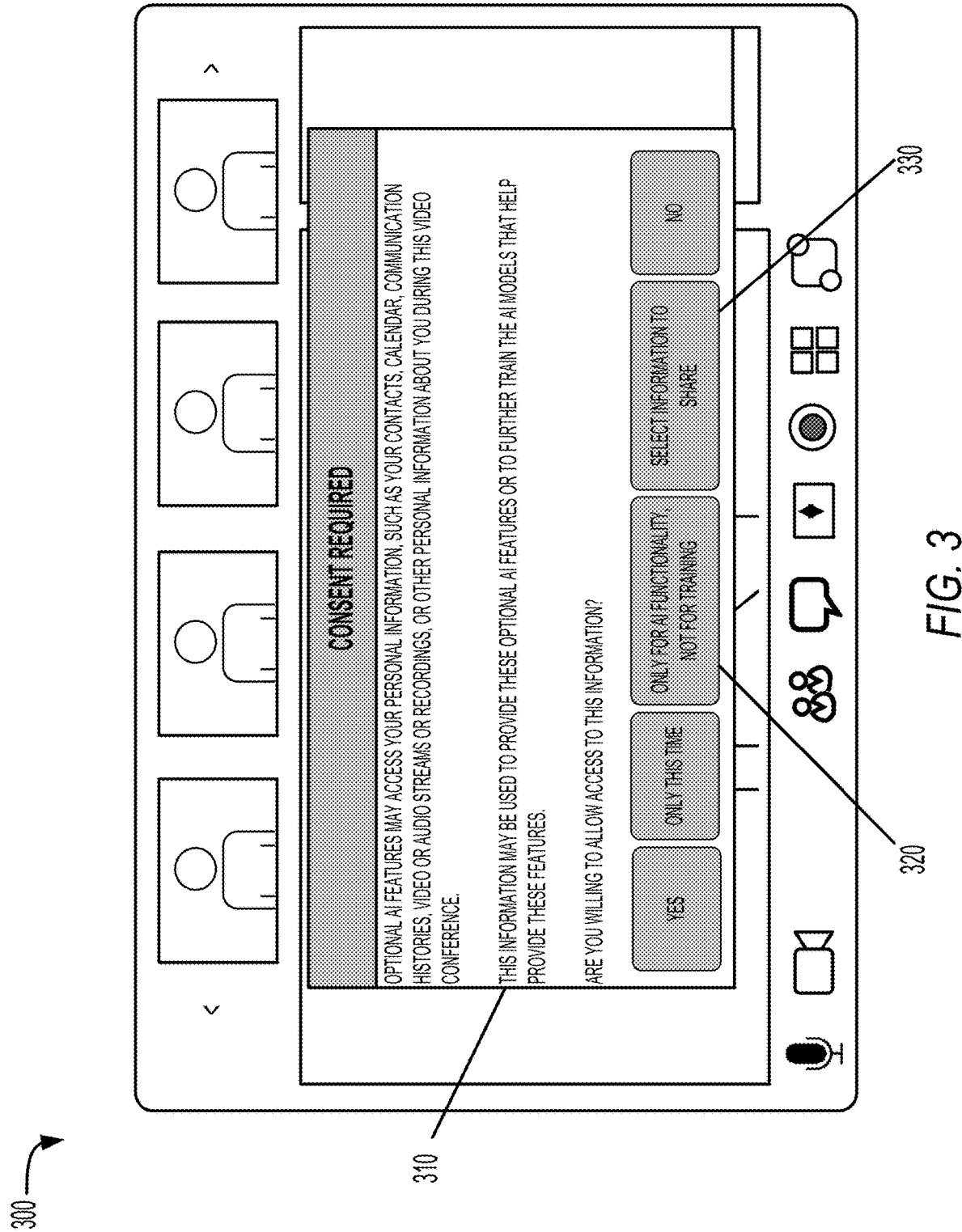
FIG. 3 shows an example user interface that may be used in some example systems configured for video conference transcript querying using artificial intelligence, according to some aspects of the present disclosure.

Turning next to FIG. 3, FIG. 3 shows an example user interface 300 that may be used in some example systems configured for video conference transcript querying using artificial intelligence. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
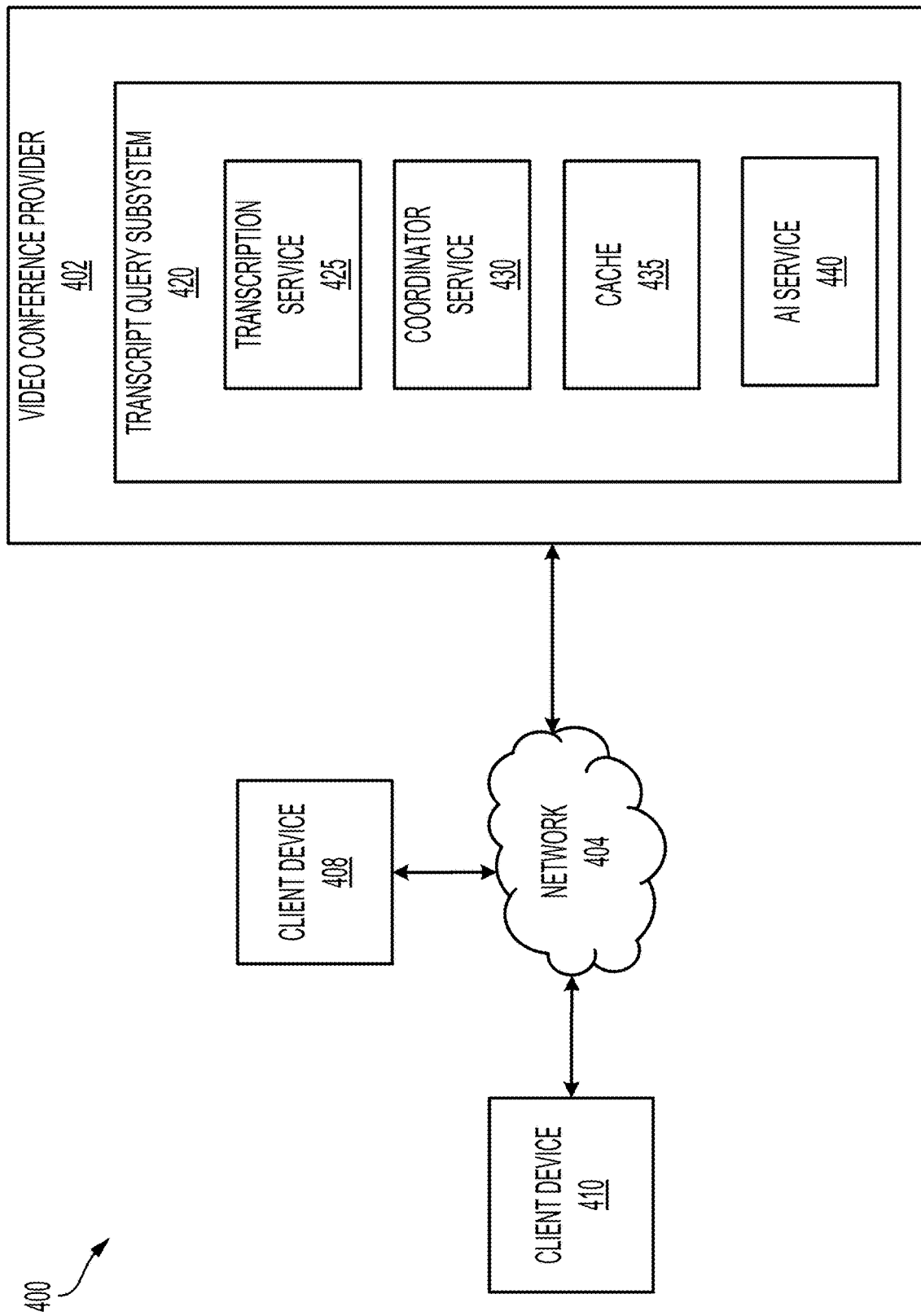
FIG. 4 shows an example of a system implementing video conference transcript querying using artificial intelligence, according to some aspects of the present disclosure.

Referring now to FIG. 4, FIG. 4 shows an example of a system 400 implementing video conference transcript querying using artificial intelligence, according to some aspects of the present disclosure. One or more client devices 408, 410 are communicatively coupled with a video conference provider 402. For example, the client devices 408, 410 may be coupled to the video conference provider over a network 404. The network 404 can include public networks, private networks, the Internet, or any other suitable combination of networked devices. The client devices 408, 410 may be personal computers, laptops, smartphones, tablets, or similar device.

In example system 400, the video conference provider 402 hosts a video conference with one or more participating client devices. A video conference may include the video or audio streams of each participant being sent from each respective client device to the video conference provider and then to the client devices of the remaining participants. For example, example system 400 depicts two client devices 408, 410 that may be participants in a video conference.

The video conference provider 402 may be similar to the video conference provider 110, 210 described in FIGS. 1 and 2. The components of the video conference provider 402 may be implemented as hardware, software, or both. The video conference provider 402 may be used for planning, hosting, coordination of, and securing video conferences among a plurality of participants, among other functions. The video conference provider 402 receives audio and video streams corresponding to ongoing video conferences from, for example, client device 408 and relays it to client device 410 for playback.

Video conference provider 402 includes transcript query subsystem 420. The transcript query subsystem 420 includes components for generation of transcripts during or after video conferences, coordination of video conference transcript querying using artificial intelligence, caching of queries, requests, etc., and artificial intelligence (AI) services, among other components.

The transcript query subsystem 420 includes a transcription service 425. The transcription service 425 receives audio streams from client devices 408, 410 that include the spoken content of video conferences. The transcription service 425 converts the audio stream of spoken content into written content using an automatic speech recognition system including, for example, systems based on machine learning (ML) architectures such as deep neural networks, transformer, and so on.

In some examples, the transcription service 425 receives an audio stream of a concluded video conference. In this case, the transcription service 425 can generate a transcript of the entire video conference. This mode of operation may be referred to as post-meeting transcript processing.

In some other examples, the transcription service 425 generates portions of the transcript as the video conference proceeds. Such a paradigm may be referred to as near-real-time transcript processing. For example, the transcription service 425 may generate a portion of the transcript based on small linguistic units such as an utterance, word, sentence, and so on. The transcription service 425 can concatenate portions, merge portions, update portions, delete portions, etc. as additional audio stream data arrives. For instance, an utterance may initially be transcribed one way and then later updated to a more fulsome transcription as additional audio context is received.

The transcript query subsystem 420 includes a coordination service 430. The coordination service 430 may receive additional information relating to the video conference from the client device 408, 410 that may be used alongside the transcript for fully contextualized responses to transcript-based queries. For instance, the client devices 408, 410 may send metadata relating the video conference in progress, user profile information, calendar information, chat dialogues, among other related contextual information.

The coordination service 430 also receives queries from the client devices 408, 410 or other query sources. In some examples, client devices other than the video conference participants may submit queries when appropriate consent is given. The coordination service 430 includes components for correlating the additional client device 408, 410 information, the transcripts or portions thereof, and queries and responses. For example, the coordination service 430 may include a web application programming interface (API), controller, and temporary storage device (e.g., in-memory cache) for coordinating communication among the client devices 408, 410, transcription service 425, and AI service 440.

The transcript query subsystem 420 may include a cache 435. The cache 435 may be used to provide sequenced ingestion of transcript data to AI service 440. For example, some cache 435 embodiments may be implemented as a queue, such as a "first-in-first-out" (FIFO) queue. The cache 435 can be used to temporarily store transcript portions or updated transcripts while AI service 440 processes a query given the previously available transcript portions or transcript. Use of cache 435 can ensure that the transcript used by AI service 440 is not updated while response generation is in progress which may cause inconsistent or incoherent responses.

The transcript query subsystem 420 includes AI service 440. AI service 440 may include, for example, an LLM such as a GPT-based chat interface. Other examples include Large Language Model Meta AI (LLaMA), Claude, Pathways Language Model (PaLM), among others. In addition to LLMs, AI service may include machine learning (ML) technologies such as neural networks, decision trees, support vector machines, k-nearest neighbors, random forests, naive Bayes classifiers, deep belief networks, reinforcement learning agents, rule-based systems, genetic algorithms, or other technologies.

AI service 440 is configured to receive a transcript or a portion thereof as well as any additional metadata collected or generated by coordination service 430. Given the received information, the AI service 440 can receive a query relating to the information and provide a response in the context of an in-progress or concluded video conference. The AI service 440 can respond on the basis of an entire video conference transcript or based only on the portion of the video conference that has occurred up to that point. The cache 435 may be used to provide sequenced and the most up-to-date version of the transcript so that the AI service 440 always responds in the context of the most recent version of the transcript available.

Figure 5A:
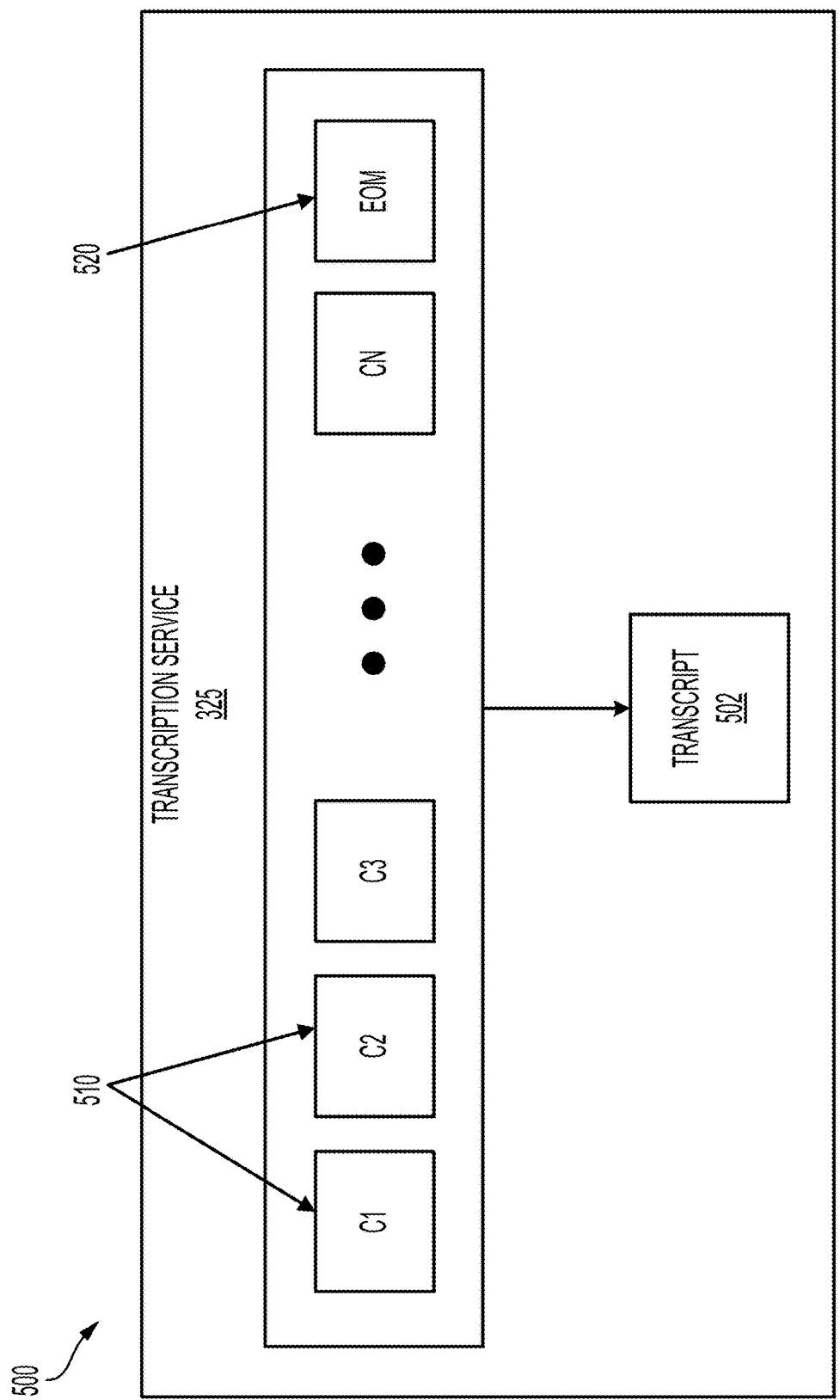
FIGS. 5A-B show examples of systems implementing video conference transcript querying using artificial intelligence, according to some aspects of the present disclosure.
Figure 5B:
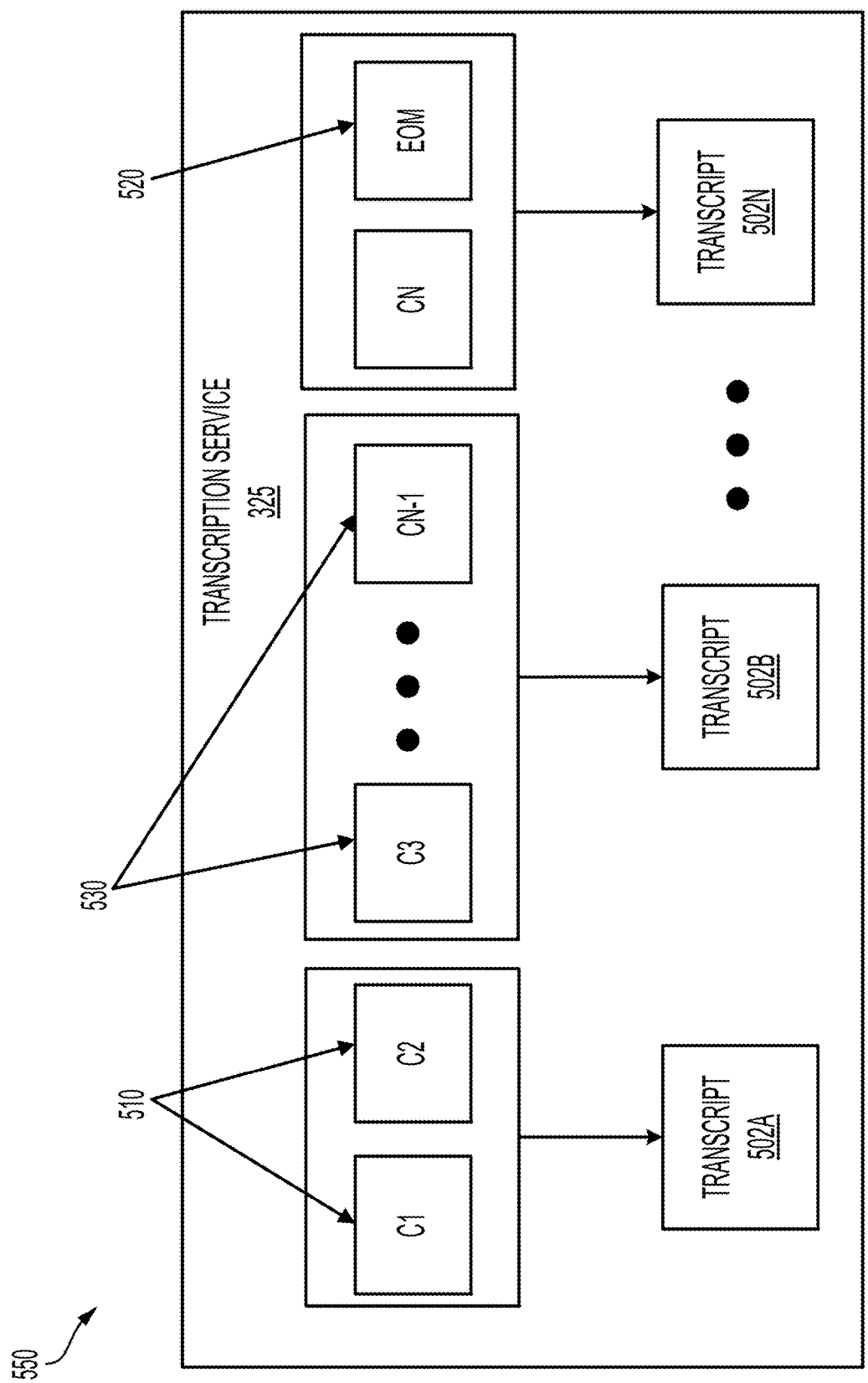

Referring now to FIGS. 5A-B, FIGS. 5A-B show examples of systems implementing video conference transcript querying using artificial intelligence. In FIG. 5A, system 500 includes transcription service 425. System 500 depicts a transcription service 425 receiving all portions of the audio stream prior to generating a transcript 502. Such an implementation may be used, for example, for post-meeting querying of the transcript using AI service 440. Transcription service 425 receives a plurality of portions 510 and may receive an end of meeting signal 520. Upon receipt of end of meeting signal 520, the transcription service 425 may generate complete transcript 502. The completed transcript, or portions thereof, may be accessed from transcription service 425 using suitable queries or APIs. In some examples, this mode of operation can be referred to as the "downstream pull" mode of operation, since the completed transcript, or portions thereof, is accessed using a pull operation such as query.

In FIG. 5B, system 450 includes a transcription service 425 that generates partial transcripts 502A . . . N. Following receipt of portions 510, partial transcript 502A can be generated. Then, following receipt of additional portions 530, partial transcript 502B can be generated. Upon receipt of end of meeting signal 520, the transcription service 425 may generate the final transcript portion 502N. In some examples, the partial transcripts 502A . . . N are incremental, but in other examples they may be cumulative and correct errors or make updates to previous versions. In some examples, the partial transcripts 502A . . . N can be combined following the receipt of the end of meeting signal 520 to generate the complete transcript 502. In some examples, the transcription service 425 can provide partial transcripts 502A . . . N to coordination service 330 for ingestion by AI service 440. For example, some applications may use only a portion of the transcript for a particular span of time during the video conference. In that case, the transcription service 425 can provide the partial transcripts 502A . . . N corresponding to the particular time span. In some examples, this mode of operation can be referred to as the "upstream push" mode of operation since portions of the transcript are continuously pushed to the AI service to provide more and more complete context.

Figure 6:
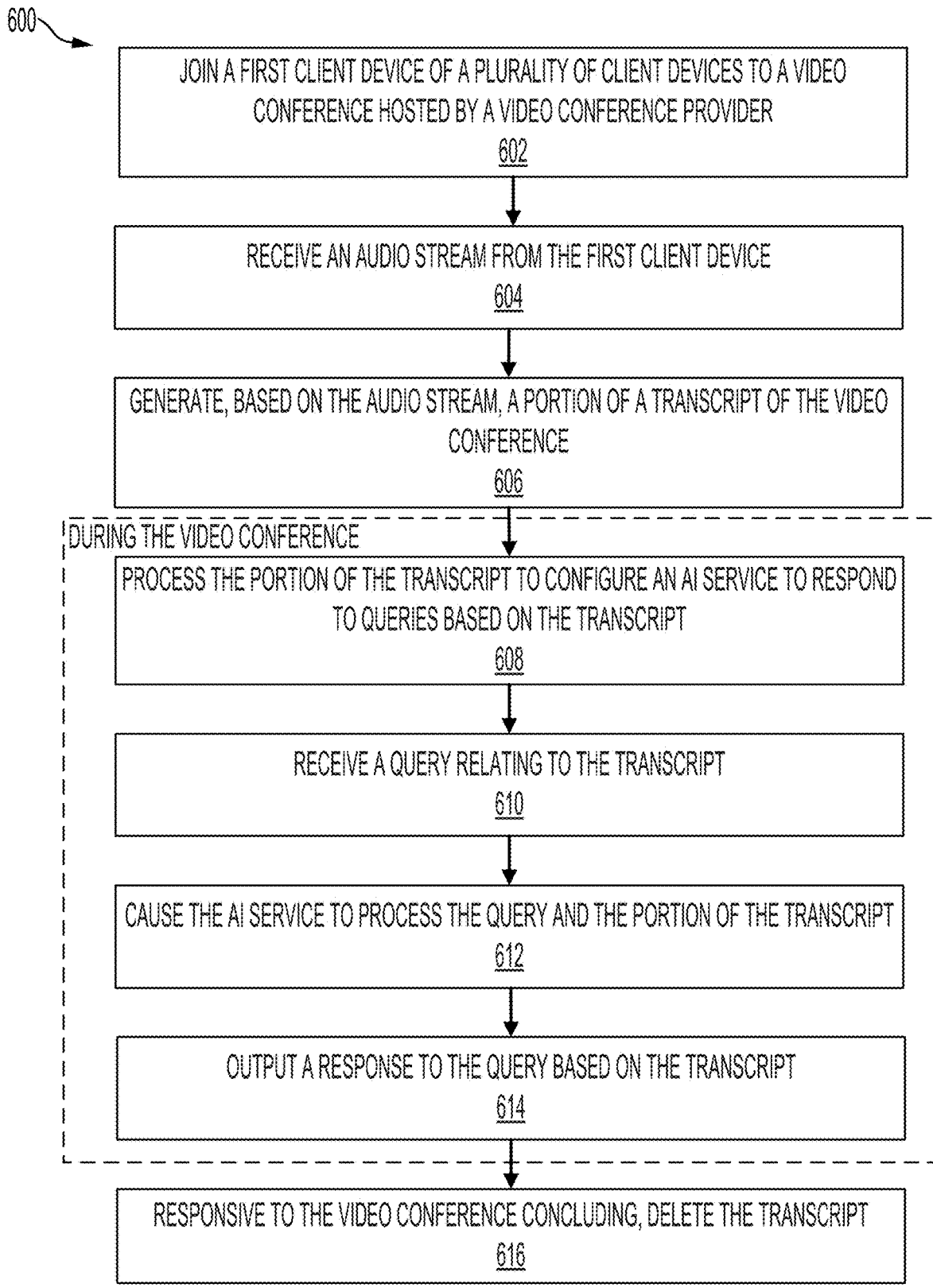
FIG. 6 shows a flowchart of an example method for providing video conference transcript querying using artificial intelligence, according to some aspects of the present disclosure.

Referring now to FIG. 6, FIG. 6 shows a flowchart of an example method 600 for providing video conference transcript querying using artificial intelligence. It should be appreciated that method 600 provides a particular method for providing video conference transcript querying using artificial intelligence. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. One of ordinary skill in the art would recognize many variations, modifications, and alternatives.

The method 600 may include block 602. At block 602, video conference provider 402 joins a first client device of a plurality of client devices 408, 410 to a video conference hosted by a video conference provider 402. For example, the video conference provider 402 may provide a video conferencing platform that participants can use by way of video conferencing client software installed on the client devices 408, 410. In some cases, the video conferencing provider 402 may be used to orchestrate video conferences with stringent security, privacy, or confidentiality requirements with respect to the making of recordings or the retainment of transcripts. At the same time, the video conference provider 402 may include, among its suite of services, functionality that requires transcripts or partial transcripts. For example, the video conference provider 402 may provide AI service 440 that requires transcripts or partial transcripts.

At block 604, video conference provider 402 receives an audio stream from the first client device 408. The video conference provider 402 may likewise receive audio streams for all video conference participants, such as client device 410. In some examples, the audio streams can include additional metadata characterizing the audio streams such as speaker names, profile data, timing information, and so on.

At block 606, video conference provider 402 generates, based on the audio stream, a portion of a transcript of the video conference. The video conference provider 402 may include a transcription service 425 that can generate an ephemeral or persisted transcript or transcript portion from the audio stream. In some examples, the transcript may be generated after the conclusion of the video conference as illustrated in FIG. 5A and system 5500. The transcript may be generated using audio stream data that is used solely for the generation of the transcript and then discarded.

In contrast, the transcript may also be continuously generated in near-real-time as illustrated in FIG. 5B and system 550. For example, the transcript may be continuously generated by transcription service 425 as a series of utterances is received. The transcript may be developed cumulatively from such utterances, including revising, editing, and correcting the transcript as additional data and context is received. In some examples, the generated transcript may be further processed to apply formatting, perform translations, etc. Once again, the transcript portions may be generated using audio stream data that is used solely for the generation of the transcript portions and then discarded.

In example method 600, blocks 608-614 are performed prior to the video conference concluding or while the video conference is still in progress. At block 608, video conference provider 402 processes the portion of the transcript to configure an AI service 440 to respond to queries based on the content or context of the video conference as may be reflected in the transcript. For example, the AI service 440 may include an ingestion function that can receive textual information to provide the context for future queries. The ingestion function may accept inputs provided by coordination service 430 that delineate boundaries of the context for responding to queries. For instance, query context may be limited to a particular period of time, accessible only to certain participants, or may be processed alongside the context for numerous video conferences simultaneously.

At block 610, video conference provider 402 receives a query relating to the content or context of the video conference as may be reflected in the transcript. The query may include information specifying the relevant context, including an identifier of the video conference, certain participants or transcript portions, a time period, and so on. The query may be a human-readable request authored by a video conference participant intended to be responded to on the basis of the context information accompanying the query. However, queries may be obtained from various sources and may even be generated by AI service 440 in an example including periodic or automatic performance of certain tasks. Typical queries may involve tasks such as summarization, generation of tasking based on meeting content, sentiment analysis, speaker identification, translation, and so on that may be well-suited for AI service 440 that includes an LLM.

However, these functions of AI service 440 and the underlying model are not intended to be limiting. One of ordinary skill in the art will appreciate that the AI service may include other components amenable to responding to natural language queries in the context of written materials such as rule-based expert systems, fuzzy genetic algorithms, finite state machines, decision support systems, knowledge bases, inference engines, as well as machine learning models such as neural network classifiers, convolutional neural networks (CNNs), recurrent neural networks (RNNs), long short-term memory networks (LSTMs), autoencoders, reinforcement learning agents, generative adversarial networks (GANs), Bayesian networks, decision trees, support vector machines (SVMs), k-nearest neighbor algorithms (k-NN), clustering algorithms like k-means, among others.

At block 612, the AI service 440 is caused to process the query and the portion of the transcript. For example, the AI service 440 may include an LLM that can respond to a natural language query in the context of a video transcript, as described above. Following an ingestion process, the AI service 440 can generate a response along with metadata that includes information about the context used for the response. For instance, the query, the portion of the transcript, and additional metadata can be ingested by the AI service 440 using natural or human-readable language or a suitable data structure. The response may additionally include information or restrictions about the retention of the context (e.g., the transcript) as well as the response itself. For instance, the response may not be persisted by the video conference provider 402 without explicit instructions to do as well as affirmatively consent from affected participants.

Three examples of categories of queries include in-meeting upstream push queries, in-meeting downstream pull queries, and post-meeting downstream pull queries. In-meeting upstream push queries typically involve tasks that relate to the latest meeting context (e.g., an up-to-the-minute transcript). Such queries may be responded to by the AI service receiving a continuously generated transcript or transcript portions. In this sense, the transcript or transcript portions are continuously "pushed" to the AI service 440. A typical example of an in-meeting upstream push query may be "please summarize the meeting up to this point."

In-meeting downstream pull queries may also rely on the up-to-date context of the video conference at query time. However, such queries are accompanied by additional query parameters. For example, a query may specify that the response be generated in the context of a particular block of time. A typical example of an in-meeting downstream pull query may be "during minutes 2 to 4, describe Alice's performance as she was talking" as may be seen in a virtual coaching scenario. Post-meeting downstream pull queries are similar, except that they are made against the context of the completed video conference transcript. In this sense, the transcript or transcript portions are "pulled" into the AI service 440 according to the query, as needed.

At block 614, the video conference provider 402 outputs a response, generated by the AI service, to the query based on the content or context of the video conference as may be reflected in the transcript. For example, the response generated by the AI service 440 is sent to the sender, for example, the first client device 408 or other video conference participants. The response may be sent as human-readable text or included in a suitable data structure.

At block 616, video conference provider 402, responsive to the video conference concluding, deletes the portion of the transcript for configuring the AI service. The ephemerally stored transcript portion may be deleted from hard disk storage, memory, caches, etc. such that following the conclusion of the meeting, there is neither a recording nor a transcript of the video conference retained by the video conference provider 402. In some examples, all portions or the entire transcript are deleted following the conclusion of the video conference.

However, in some examples, the transcript may be persisted with explicit instructions to do as well as affirmatively consent from affected participants. For instance, the transcript may be persisted to provide virtual coaching services for participants following the conclusion of the video conference. As another example, the transcript deletion just described may be performed responsive to receipt of a deletion election. The deletion election may be, for example, an indication of an affirmative intent to delete or retain a recording or transcript, generated in response to a user interface prompt presented to the user upon conclusion of the video conference.

Figure 7:
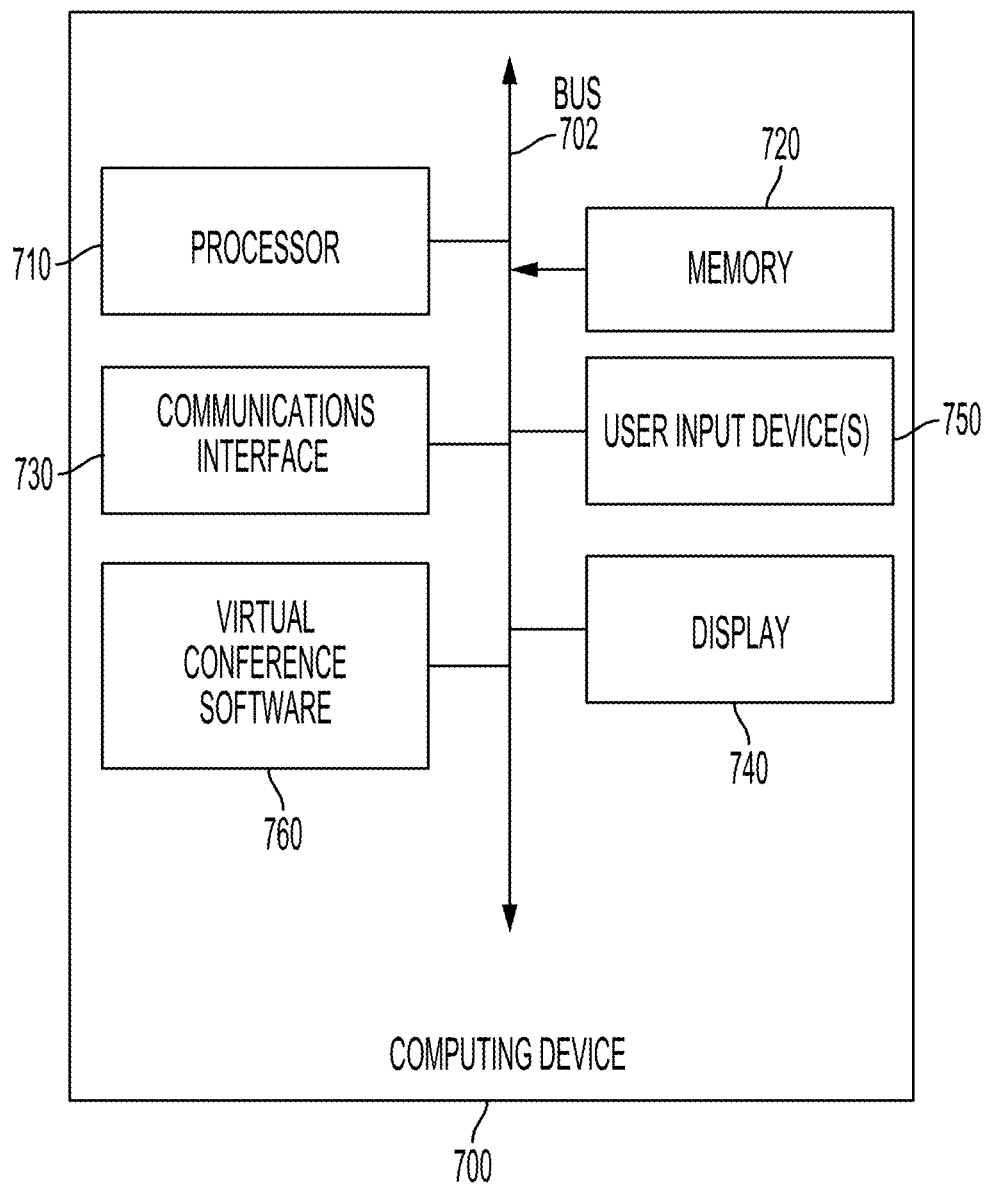
FIG. 7 shows an example computing device suitable for use in example systems or methods for providing video conference transcript querying using artificial intelligence, according to some aspects of the present disclosure.

Referring now to FIG. 7, FIG. 7 shows an example computing device 700 suitable for use in example systems or methods for providing video conference transcript querying using artificial intelligence according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for video conference transcript querying using artificial intelligence according to different examples, such as part or all of the example method 700 described above with respect to FIG. 7. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes virtual conferencing software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: joining a first client device of a plurality of client devices to a video conference hosted by a video conference provider; receiving an audio stream from the first client device; generating, based on the audio stream, a portion of a transcript of the video conference; processing the portion of the transcript to configure an AI service to respond to queries based on the video conference, including the portion of the transcript; receiving a query relating to the video conference; processing, by the AI service, the query and the portion of the transcript; outputting a response, generated by the AI service, to the query; and responsive to the video conference concluding, deleting the transcript.

Example 2 is the method of example(s) 1, wherein generating the portion of the transcript of the video conference comprises: determining, from the audio stream, one or more audio stream portions; responsive to an end of meeting signal, generating the transcript based on the one or more audio stream portions; and designating the transcript as the portion of the transcript.

Example 3 is the method of example(s) 1, wherein generating the portion of the transcript of the video conference comprises: determining, from the audio stream, one or more audio stream portions; and generating, based on the one or more audio stream portions, a first portion of the transcript.

Example 4 is the method of example(s) 3, wherein the one or more audio stream portions comprise one or more utterances, each utterance comprising at least a portion of a word.

Example 5 is the method of example(s) 3, wherein generating the portion of the transcript of the video conference further comprises: determining, from the audio stream, one or more second audio stream portions; generating, based on the one or more second audio stream portions, a second portion of the transcript; generating, based on the first portion of the transcript and the second portion of the transcript, the portion of the transcript; determining, from the audio stream, one or more third audio stream portions; responsive to an end of meeting signal, generating a third portion of the transcript based on the one or more third audio stream portions; generating the transcript based on the first portion of the transcript, the second portion of the transcript, and the third portion of the transcript; and designating the transcript as the portion of the transcript.

Example 6 is the method of example(s) 1, wherein the AI service comprises a large language model.

Example 7 is the method of example(s) 1, wherein AI service processes at least one of metadata relating to the video conference, user profile information, calendar information, or chat information.

Example 8 is a non-transitory computer-readable medium storing instructions that, when executed by one or more processors, cause the one or more processors to perform operations including: joining a first client device of a plurality of client devices to a video conference hosted by a video conference provider; receiving an audio stream from the first client device; generating, based on the audio stream, a portion of a transcript of the video conference; processing the portion of the transcript to configure an AI service to respond to queries based on the video conference, including the portion of the transcript; receiving a query relating to the video conference; processing, by the AI service, the query and the portion of the transcript; outputting a response, generated by the AI service, to the query; and responsive to the video conference concluding, deleting the transcript.

Example 9 is the non-transitory computer-readable medium of example(s) 8, wherein generating the portion of the transcript of the video conference comprises: determining, from the audio stream, one or more audio stream portions; and generating, based on the one or more audio stream portions, a first portion of the transcript; determining, from the audio stream, one or more second audio stream portions; generating, based on the one or more second audio stream portions, a second portion of the transcript; generating, based on the first portion of the transcript and the second portion of the transcript, the portion of the transcript; determining, from the audio stream, one or more third audio stream portions; responsive to an end of meeting signal, generating a third portion of the transcript based on the one or more third audio stream portions; generating the transcript based on the first portion of the transcript, the second portion of the transcript, and the third portion of the transcript; and designating the transcript as the portion of the transcript.

Example 10 is the non-transitory computer-readable medium of example(s) 8, wherein the portion of the transcript is generated in near-real-time.

Example 11 is the non-transitory computer-readable medium of example(s) 8, further comprising receiving an indication of a period of time, wherein the AI service is configured to base the response on the portion of the transcript included in the period of time.

Example 12 is the non-transitory computer-readable medium of example(s) 8, wherein the query is human-readable.

Example 13 is the non-transitory computer-readable medium of example(s) 12, wherein the query is a request to summarize the video conference.

Example 14 is the non-transitory computer-readable medium of example(s) 8, wherein the response comprises metadata comprising information about a response context.

Example 15 is a system comprising: one or more processors; and one or more computer-readable storage media storing instructions which, when executed by the one or more processors, cause the one or more processors to perform operations including: joining a first client device of a plurality of client devices to a video conference hosted by a video conference provider; receiving an audio stream from the first client device; generating, based on the audio stream, a portion of a transcript of the video conference; processing the portion of the transcript to configure an AI service to respond to queries based on the video conference, including the portion of the transcript; receiving a query relating to the video conference; processing, by the AI service, the query and the portion of the transcript; outputting a response, generated by the AI service, to the query; and responsive to the video conference concluding, deleting the transcript.

Example 16 is the system of example(s) 15, wherein the query is human-readable and wherein the query comprises query context information.

Example 17 is the system of example(s) 16, wherein the query is a request to generate one or more tasks based on the video conference.

Example 18 is the system of example(s) 15, wherein deleting the transcript comprises removing information from at least one of a hard disk, a memory device, or a memory cache.

Example 19 is the system of example(s) 15, wherein the portion of the transcript is generated in near-real-time and the query comprises query parameters, wherein the query parameters define a context in which to generate the response.

Example 20 is the system of example(s) 15, wherein generating the portion of the transcript of the video conference comprises: determining, from the audio stream, one or more audio stream portions; responsive to an end of meeting signal, generating the transcript based on the one or more audio stream portions; and designating the transcript as the portion of the transcript.

What is claimed is:

1. A method, comprising:
   joining a first client device of a plurality of client devices to a video conference hosted by a video conference provider;
   receiving an audio stream from the first client device;
   generating, based on the audio stream, a portion of a transcript of the video conference;
   prior to the video conference concluding:
      processing the portion of the transcript to configure an AI service to respond to queries based on the video conference, including the portion of the transcript;
      receiving a query relating to the video conference;
      causing the AI service to process the query and the portion of the transcript; and
      outputting a response, generated by the AI service, to the query; and
   responsive to the video conference concluding, deleting the portion of the transcript for configuring the AI service.

2. The method of claim 1, further comprising responsive to the video conference concluding, deleting the transcript.

3. The method of claim 1, further comprising receiving a deletion election, wherein deleting the portion of the transcript for configuring the AI service is further responsive to the deletion election.

4. The method of claim 1, wherein generating the portion of the transcript of the video conference comprises:
   determining, from the audio stream, one or more audio stream portions;
   responsive to an end of meeting signal, generating the transcript based on the one or more audio stream portions; and
   designating the transcript as the portion of the transcript.

5. The method of claim 1, wherein generating the portion of the transcript of the video conference comprises:
   determining, from the audio stream, one or more audio stream portions; and
   generating, based on the one or more audio stream portions, a first portion of the transcript.

6. The method of claim 5, wherein the one or more audio stream portions comprise one or more utterances, each utterance comprising at least a portion of a word.

7. The method of claim 5, wherein generating the portion of the transcript of the video conference further comprises:
   determining, from the audio stream, one or more second audio stream portions;
   generating, based on the one or more second audio stream portions, a second portion of the transcript;
   generating, based on the first portion of the transcript and the second portion of the transcript, the portion of the transcript;
   determining, from the audio stream, one or more third audio stream portions;
   responsive to an end of meeting signal, generating a third portion of the transcript based on the one or more third audio stream portions;
   generating the transcript based on the first portion of the transcript, the second portion of the transcript, and the third portion of the transcript; and
   designating the transcript as the portion of the transcript.

8. The method of claim 1, wherein the AI service comprises a large language model.

9. A non-transitory computer-readable medium storing instructions that, when executed by one or more processors, cause the one or more processors to perform operations including:
   joining a first client device of a plurality of client devices to a video conference hosted by a video conference provider;
   receiving an audio stream from the first client device;
   generating, based on the audio stream, a portion of a transcript of the video conference;
   prior to the video conference concluding:
      processing the portion of the transcript to configure an AI service to respond to queries based on the video conference, including the portion of the transcript;
      receiving a query relating to the video conference;
      causing the AI service to process the query and the portion of the transcript; and
      outputting a response, generated by the AI service, to the query; and
   responsive to the video conference concluding, deleting the portion of the transcript for configuring the AI service.

10. The non-transitory computer-readable medium of claim 9, further responsive to the video conference concluding, deleting the transcript.

11. The non-transitory computer-readable medium of claim 9, wherein generating the portion of the transcript of the video conference comprises:
   determining, from the audio stream, one or more audio stream portions; and
   generating, based on the one or more audio stream portions, a first portion of the transcript;
   determining, from the audio stream, one or more second audio stream portions;
   generating, based on the one or more second audio stream portions, a second portion of the transcript;
   generating, based on the first portion of the transcript and the second portion of the transcript, the portion of the transcript;
   determining, from the audio stream, one or more third audio stream portions;
   responsive to an end of meeting signal, generating a third portion of the transcript based on the one or more third audio stream portions;

generating the transcript based on the first portion of the transcript, the second portion of the transcript, and the third portion of the transcript; and designating the transcript as the portion of the transcript.

12. The non-transitory computer-readable medium of claim 9, wherein the portion of the transcript is generated in near-real-time.

13. The non-transitory computer-readable medium of claim 9, further comprising receiving an indication of a period of time, wherein the AI service is configured to base the response on the portion of the transcript included in the period of time.

14. The non-transitory computer-readable medium of claim 9, wherein the query is human-readable and the query is a request to summarize the video conference.

15. A system comprising:
one or more processors; and
one or more computer-readable storage media storing instructions which, when executed by the one or more processors, cause the one or more processors to perform operations including:
  joining a first client device of a plurality of client devices to a video conference hosted by a video conference provider;
  receiving an audio stream from the first client device;
  generating, based on the audio stream, a portion of a transcript of the video conference;
  prior to the video conference concluding:
    processing the portion of the transcript to configure an AI service to respond to queries based on the video conference, including the portion of the transcript;
    receiving a query relating to the video conference;
    causing the AI service to process the query and the portion of the transcript; and
    outputting a response, generated by the AI service, to the query; and
  responsive to the video conference concluding, deleting the portion of the transcript for configuring the AI service.

16. The system of claim 15, further comprising receiving a deletion election comprising an election to delete the transcript, wherein deleting the portion of the transcript for configuring the AI service is further responsive to the deletion election.

17. The system of claim 15, wherein the query is human-readable and wherein the query comprises query context information and the query is a request to generate one or more tasks based on the video conference.

18. The system of claim 15, wherein deleting the transcript comprises removing information from at least one of a hard disk, a memory device, or a memory cache.

19. The system of claim 15, wherein the portion of the transcript is generated in near-real-time and the query comprises query parameters, wherein the query parameters define a context in which to generate the response.

20. The system of claim 15, wherein generating the portion of the transcript of the video conference comprises:
determining, from the audio stream, one or more audio stream portions;
responsive to an end of meeting signal, generating the transcript based on the one or more audio stream portions; and
designating the transcript as the portion of the transcript.

\* \* \* \* \*